(12) United States Patent
Caruso

(10) Patent No.: US 10,231,433 B1
(45) Date of Patent: Mar. 19, 2019

(54) PET PROTECTION DEVICE

(71) Applicant: William M. Caruso, Elmhurst, IL (US)

(72) Inventor: William M. Caruso, Elmhurst, IL (US)

( * ) Notice: Subject to any disclaimer, the term of this patent is extended or adjusted under 35 U.S.C. 154(b) by 0 days.

(21) Appl. No.: 14/459,546

(22) Filed: Aug. 14, 2014

(51) Int. Cl.
*A01K 13/00* (2006.01)

(52) U.S. Cl.
CPC .................. *A01K 13/006* (2013.01)

(58) Field of Classification Search
CPC .... A01K 13/006; A01K 27/002; A01K 13/00; A01K 29/00; A01K 23/00; A61D 9/00
USPC ....... 119/850, 856, 858, 863, 865, 770, 792, 119/793; 2/2.5; 54/79.1, 79.2, 79.3, 79.4
See application file for complete search history.

(56) References Cited

U.S. PATENT DOCUMENTS

| | | | | |
|---|---|---|---|---|
| 2,194,921 A | * | 3/1940 | Wagner, Jr. | A01K 13/007 54/82 |
| 3,209,517 A | * | 10/1965 | Hyman | A01K 13/007 119/850 |
| 4,510,888 A | * | 4/1985 | DeAngelis | A61D 9/00 119/850 |
| 4,911,150 A | * | 3/1990 | Farley | A61F 5/0585 54/82 |
| 5,996,537 A | * | 12/1999 | Caditz | A01K 13/008 119/850 |
| 8,015,948 B2 | * | 9/2011 | Hall | A01K 13/006 119/850 |
| 2005/0284418 A1 | * | 12/2005 | Benefiel | A01K 13/006 119/850 |
| 2006/0090711 A1 | * | 5/2006 | Richards | A01K 13/006 119/850 |
| 2012/0160184 A1 | * | 6/2012 | Lichvar | A01K 27/002 119/725 |
| 2012/0298051 A1 | * | 11/2012 | Cho | A01K 27/002 119/792 |

* cited by examiner

*Primary Examiner* — Trinh T Nguyen
(74) *Attorney, Agent, or Firm* — Charles T. Riggs, Jr.

(57) ABSTRACT

The present subject matter relates to a pet protection device comprising a single layer of semi-rigid twenty gauge polycarbonate designed to protect pets such as small dogs from an attack by a bird of prey. In use, the device is strapped to the dogs' back and prevents the talons of birds of prey from penetrating through the back and/or sides of the dog's body.

16 Claims, 9 Drawing Sheets

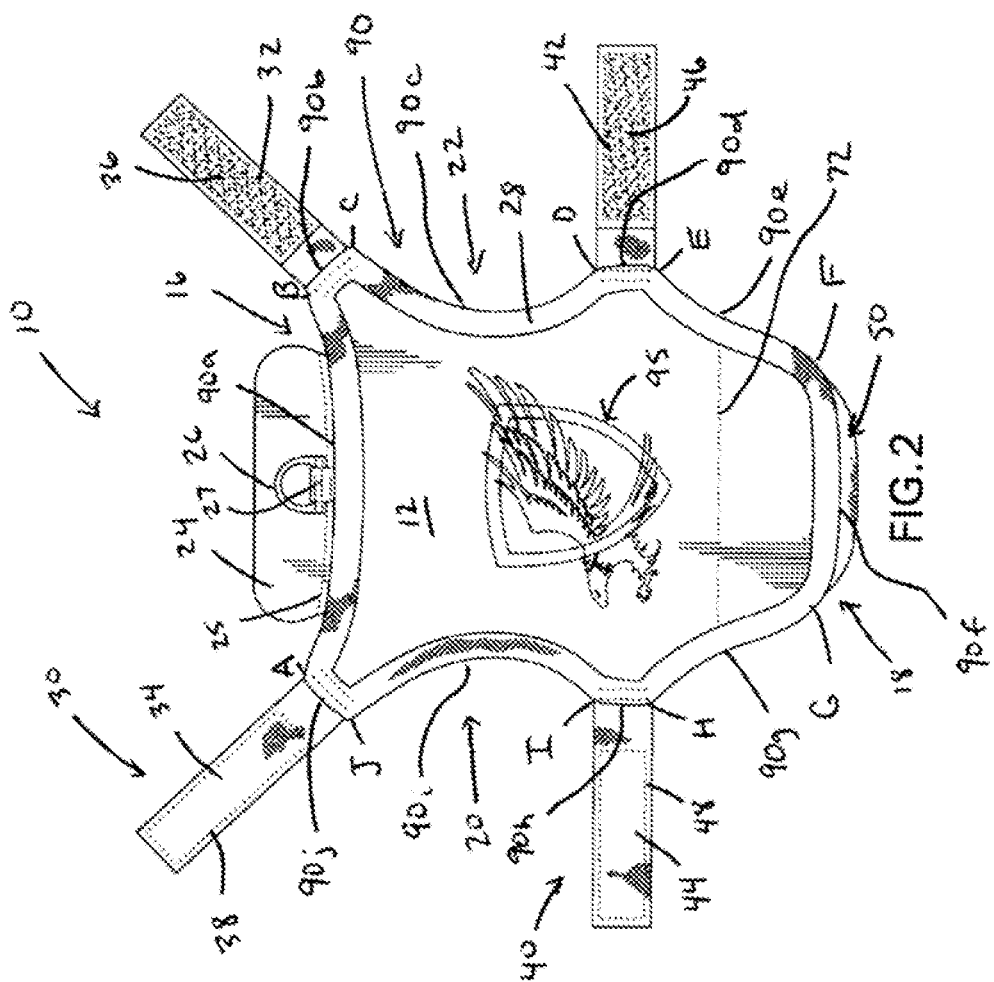

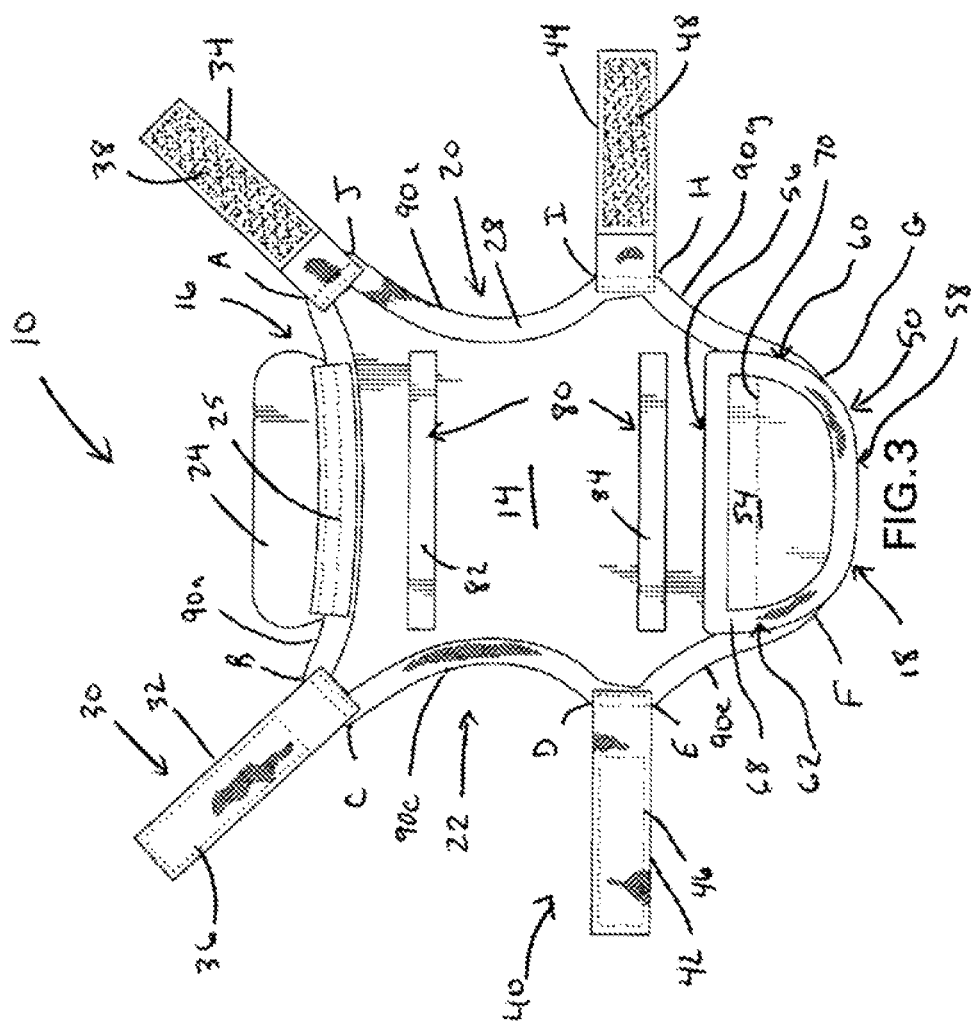

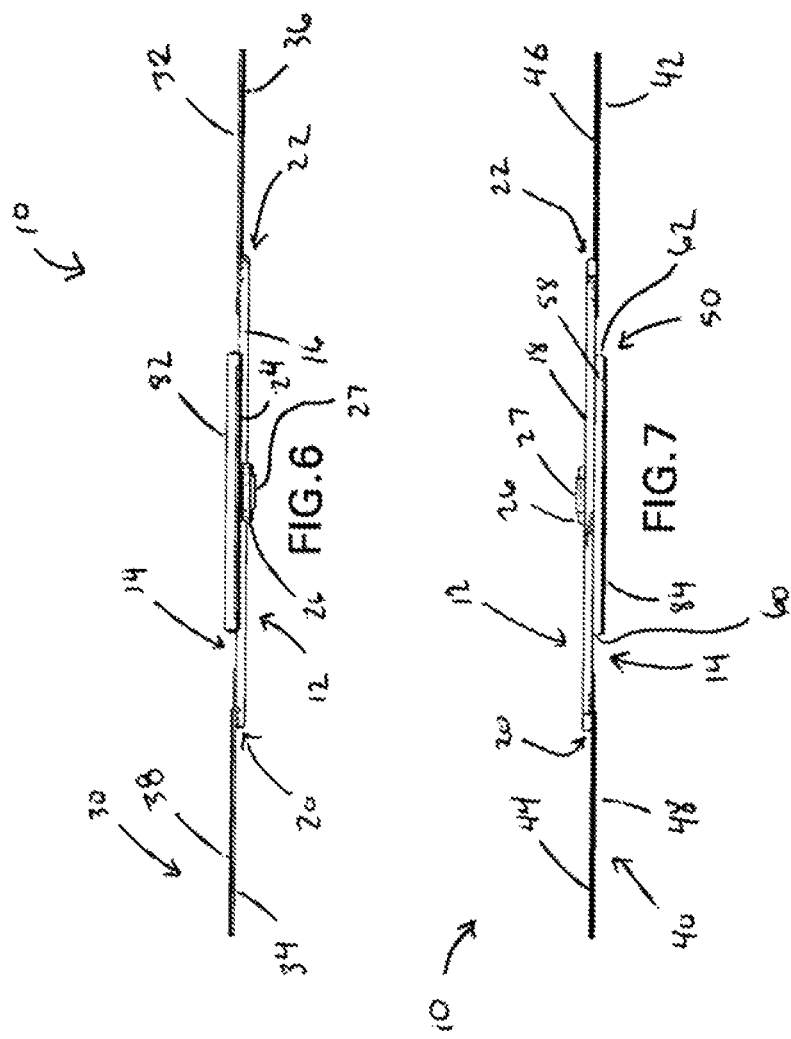

PET PROTECTION DEVICE

TECHNICAL FIELD

The exemplary teachings herein pertain to a method and device for protecting pets, and in particular, to a method and device for shielding pets from predatory animals such as birds of prey. Specifically, the present disclosure relates to a semi-rigid protection device worn by a pet to shield the pet from the claws or talons of a predatory animal.

BACKGROUND

Small animals are vulnerable to attack by predatory animals, especially birds of prey or raptors which swoop down to grab the small animal in their talons. Birds of prey often swoop down out of the sky at great speeds and attempt to grasp with their talons, the small animals around their torso area or more specifically around their back, and if successful, lift the small animal off the ground and soar away with the animal. Even if unsuccessful, the force of the impact from the bird of prey and its talons causes extensive injury to the small animal and can potentially be fatal.

Today, more and more people are moving farther from large metropolitan or urban areas and living in more rural areas or country towns and cities abundant with wildlife, and as the population of such birds of prey is increasing, so also are such attacks from birds of prey on small animals increasing. This presents a clear and present danger to small pets, and in particular, but not limited to, small dogs or puppies. Attacks from birds of prey on such small pets are occurring more frequently. Anytime these small pets are outdoors, they are vulnerable to an attack by a bird of prey. Should such an attack occur, the results can be devastating, not only physically to the pet, but emotionally to the pet owner as well.

There exist a number of protection devices for animals, used for various reasons. For example, the following devices are known in the art.

U.S. Pat. No. 4,510,888 issued to DeAngelis et al. on Apr. 16, 1985 discloses a protective shield assembly for encircling and protecting the leg of an animal, particularly a canine, to permit healing of a wound and to substantially prevent continued self-destruction of the healing process. This device is used in a medical form to prevent an animal from chewing, licking, or irritating a leg wound, and is designed to withstand the effects of chewing or gnawing by the canine of the canine's leg. This device is to be used after an operation or injury has occurred on or to the canine's leg. Unlike this device which would not protect against an attack from a bird of prey, the protective device of the present invention is not intended for a medical purpose to protect an existing leg wound. Rather it is designed to protect small dogs (e.g., twelve lbs. and under) from hawks or other raptors or birds of prey, to prevent the talons of birds of prey from penetrating through the back and/or sides of the dog's body.

U.S. Pat. No. 5,996,537 issued to Caditz on Dec. 7, 1999 discloses a full body, protective canine coat, particularly for protecting canines from extreme climates. This device consist of a thermal lining such as polar fleece and nylon which completely surrounds the canine's torso via a chest/belly section and a back cover section, to protect hunting and sled racing canines primarily from extreme weather. This fill body canine coat is intended to help control canine body temperature in extreme weather. The coat also includes a hood, and an upper neck protection with fasteners. Unlike this device which would not protect against an attack from a bird of prey, the protective device of the present invention is not intended for protection from extreme weather, does not control the temperature of the body so that dogs can endure extreme temperatures, and does not cover the dog's belly, upper neck or head. Rather it is designed to protect small dogs (e.g., twelve lbs. and under) from hawks or other raptors or birds of prey, to prevent the talons of birds of prey from penetrating through the back and/or sides of the dog's body.

U.S. Pat. No. 6,089,194 issued to LaBelle on Jul. 18, 2000 discloses a reversible heat-reflective pet garment designed to protect against hot or cold temperatures. The coat is made up of colored polyethylene and aluminized polyethylene which are soft to the touch. These materials are heat fused together to provide reversible protection against hot or cold temperatures. The cut of the garment is a generally rectangular shape with a cut out neck portion. Unlike this device which would not protect against an attack from a bird of prey, the protective device of the present invention is not intended for protection from hot or cold temperatures. Rather it is designed to protect small dogs (e.g., twelve lbs. and under) from hawks or other raptors or birds of prey, to prevent the talons of birds of prey from penetrating through the back and/or sides of the dog's body.

U.S. Pat. No. 8,015,948 issued to Hall on Sep. 13, 2011 discloses a canine protective suit which resembles a suit of armor for a canine, connected with fastener or buckles, which protects the upper and lower body along with the legs, head, and neck. There is also a face shield made with ear cutouts, which is supported with straps to the neck and back of the shield. This is a federally sponsored development that was researched and designed to be used for law enforcement agencies training canines. This armor helps protect a canine's face and body from serious dangers while assisting law enforcement including military or fire departments in dangerous crimes, search and rescue situations, including bomb or other explosive threats. This is climate controlled and mostly to protect canines from extreme hazards and crime related injuries. The protective suit is made of flotational, bulletproof, fire resistant, and non-pierceable protective materials, with additional protective materials such as fabric, plastic or metal selectively secured to the canine's protective suit. Unlike this device which is not intended to protect against an attack from a bird of prey, and which would be cumbersome, uncomfortable and cost prohibitive for such use, the protective device of the present invention is not intended for protection from extreme hazards or climate conditions, and crime related injuries and occupational risks, or to be used as a flotational device, or bomb or bulletproof protection. Rather it is designed to protect small dogs (e.g., twelve lbs. and under) from hawks or other raptors or birds of prey, to prevent the talons of birds of prey from penetrating through the back and/or sides of the dog's body.

U.S. Patent Application Publication No. 2004/0045512 to Goudal on Mar. 11, 2004 discloses an ergonomic and adjustable veterinary apparatus for movement restriction designed to prevent an animal from reaching a zone of its body with its mouth or paws. The apparatus is designed to prevent the canine from causing further injury after surgical procedures, by restricting the animal's movement. Unlike this device which would not protect against an attack from a bird of prey, the protective device of the present invention is not intended to limit the movement of an animal. Rather it is designed to protect small dogs (e.g., twelve lbs. and under) from hawks or other raptors or birds of prey, to prevent the talons of birds of prey from penetrating through the back and/or sides of the dog's body.

U.S. Patent Application Publication No. 2005/0284418 to Benefiel on Dec. 29, 2005 discloses a doggie blanket coat comprising a generally rectangular blanket with relatively wide straps that secure the blanket around the chest and stomach of the dog. This is primarily used to help control dogs body temperature in extreme weather, and also to provide comfort to the animal. Unlike this device which would not protect against an attack from a bird of prey, the protective device of the present invention is not intended to be a flat, soft blanket-like coat used to comfort dogs in extreme weather. Rather it is designed to protect small dogs (e.g., twelve lbs. and under) from hawks or other raptors or birds of prey, to prevent the talons of birds of prey from penetrating through the back and/or sides of the dog's body.

U.S. Patent Application Publication No. 2010/0319632 to Blizzard on Dec. 23, 2010 discloses a pressure applying garment for animals used to reduce anxiety and or calm animals from loud noises like thunder or fireworks. The garment is fastened together using Velcro® and comprises spandex material that is stretchable and soft to the touch. Unlike this device which would not protect against an attack from a bird of prey, the protective device of the present invention is not intended to reduce anxiety or put pressure on a dog's body. Rather it is designed to protect small dogs (e.g., twelve lbs. and under) from hawks or other raptors or birds of prey, to prevent the talons of birds of prey from penetrating through the back and/or sides of the dog's body.

U.S. Patent Application Publication No. 2012/0174876 to Johnson on Jul. 12, 2012 discloses body armor or a multi-layered bullet-proof vest, for both humans and canines, to be used while hunting, as protection from firearms such as shotguns or pellet guns. The body armor comprises eight layers of fabric including nylon, laminated aramid fabric, and polypropylene. Unlike this device which is not intended to protect against an attack from a bird of prey, and which would be cumbersome, uncomfortable and cost prohibitive for such use, the protective device of the present invention is not intended as a bullet-proof vest. Rather it is designed to protect small dogs (e.g., twelve lbs. and under) from hawks or other raptors or birds of prey, to prevent the talons of birds of prey from penetrating through the back and/or sides of the dog's body.

The above described prior art devices are not intended to protect a small pet against an attack from a bird of prey, and suffer from numerous disadvantages and shortcomings. In general, these devices are bulky, cumbersome, uncomfortable, difficult to put on, restrict the animal's movement, and/or are expensive and complicated. Therefore, a need exists for a device which protects small pets from hawks or other raptors or birds of prey, to prevent the talons of birds of prey from penetrating through the back and/or sides of the dog's body, without injury to either the pet or the bird of prey, and also which is lightweight, safe and easy to use, unrestrictive, comfortable, and inexpensive, yet durable and capable of performing as intended, and which overcomes these and other disadvantages and shortcomings of prior art devices. The protection device of the exemplary teachings disclosed herein fulfills such a need.

SUMMARY

The present disclosure relates to a shield for small pets, especially dogs, to wear for protection from birds of prey or raptors such as a hawk, and a method of using the same. This shield protects small dogs from such attacks by shielding the area of the dog where most attacks occur, namely the dog's back. The shield is also designed such that the bird's talons slide or glance off of the shield in a manner such that the bird is not injured as well. Preferably, the shield has a brightly colored perimeter, preferably red, to serves as a visual deterrent to such attacks.

The shield comprises a semi-rigid plastic material or the like, preferably a single layer of twenty gauge polycarbonate, which cannot be penetrated by the raptor's talons. The shield is designed such that the raptor's talons will simply slide off of the shield, thereby protecting the dog from the attack, without harming the raptor as well.

The shield may have extension pieces which attach (e.g. by Velcro®) to the back end of shield to lengthen the shield for longer dogs, or otherwise provide for adjustability or custom fit of the shield for any particular sized/shaped dog. Extensions can be provided on the sides of the shield as well.

A leather piece is attached at the top end of the shield to provide comfort near the back of the dog's neck. A metal ring is affixed to the shield near the leather piece for attachment of a leash.

In use, the shield is removably strapped around the dog's torso via two straps or bands fastened via Velcro®. The shape of the shield is organic, not rectangular, and protects the back and sides of the pet, wherein the sides of the shield have generally rounded out curves from the midsection to the front and back ends to make it more flexible and comfortable to wear, especially near the front and hind legs. The two straps each have a first and second portion which adjustably attach at the ends. The front strap extends at an angle to the longitudinal axis of the shield, while the other strap located approximate the midsection of the shield extends perpendicular to the longitudinal axis of the shield.

Additionally, foam strips are provided on the underside of the shield to space the shield away from the dogs fur/skin to provide comfort and reduce heat during use. In cold weather, a liner is provided which adds comfort when in use, and prevents the loss of heat in the area of the liner. The shield is semi-rigid, yet lightweight and comfortable for the pet to wear, and will not restrict movement while wearing the shield, and will not prevent the pet from reaching the shield with its mouth or paws for self-adjustment or to scratch an itch.

Additional objects, advantages and novel features will be set forth in part in the description which follows, and in part will become apparent to those skilled in the art upon examination of the following and the accompanying drawings or may be learned by production or operation of the examples.

BRIEF DESCRIPTION OF THE DRAWINGS

The drawing figures depict one or more implementations in accord with the present teachings, by way of example only, not by way of limitation. In the drawing figures, like reference numerals refer to the same or similar elements.

FIG. 2 is a front view of the pet protection device.

FIG. 3 is a back view of the pet protection device.

FIG. 6 is a top view of the pet protection device, as seen from the top of FIG. 2.

FIG. 7 is a bottom view of the pet protection device, as seen from the bottom of FIG. 2.

DETAILED DESCRIPTION

The following description refers to numerous specific details which are set forth by way of examples to provide a thorough understanding of the relevant teachings. It should be apparent to those skilled in the art that the present teachings may be practiced without such details. In other instances, well known methods, procedures, and components have been described at a relatively high-level, without detail, in order to avoid unnecessarily obscuring aspects of the present teachings.

Figure 1:
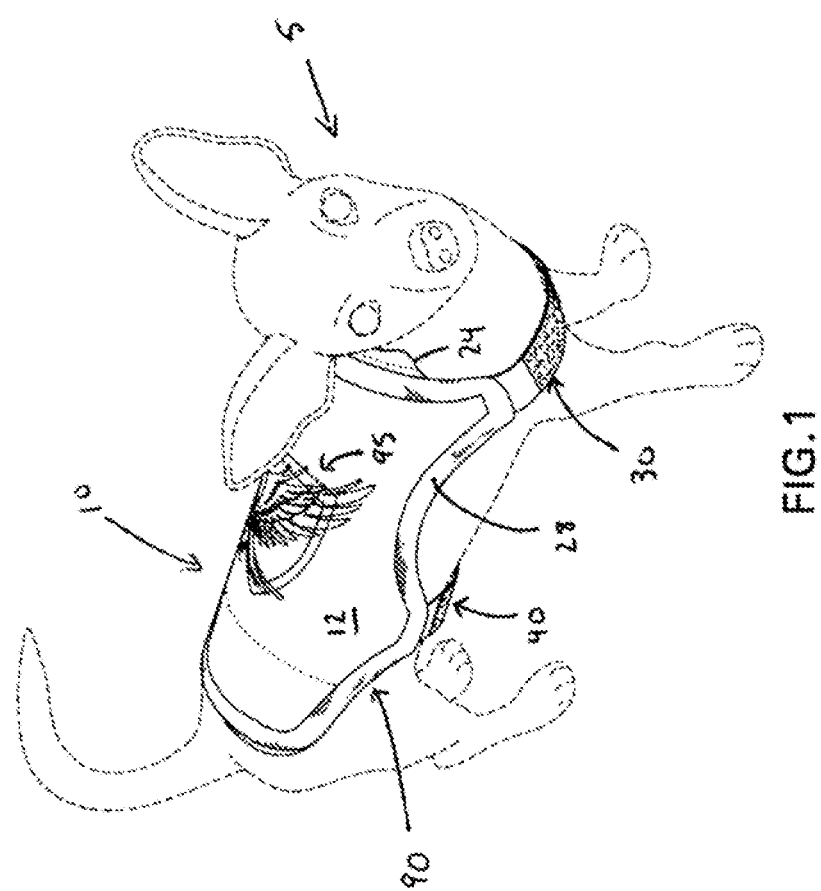
FIG. 1 is a perspective view of the pet protection device shown in use.

FIG. 1 illustrates a perspective view of the pet protection device 10 shown in use on an animal, specifically a small dog 5. The pet protection device 10 preferably comprises a thin sheet of a single layer of semi-rigid twenty gauge polycarbonate, designed to prevent the talons of a bird of prey from penetrating the pet protection device, and thereby preventing injury to the dog in case of an attack by a bird of prey. The talons of the bird of prey will merely slide or glance off of the surface of the polycarbonate, without injuring the bird of prey, and thereby preventing injury to the dog. The polycarbonate layer can be in the range of approximately 15-20 gauge in thickness. Below the 15 gauge thickness, the polycarbonate would be too thin and could be punctured by the talons of a bird of prey. Above the 20 gauge thickness, the device will be too thick and would uncomfortable for a small dog. A 20 gauge thickness provides the most effective protection, while at the same time remaining comfortable for a small dog to wear.

The pet protection device 10 is strapped to the dog 5 via a front strap 30 and a midsection strap 40 which can be suitably fastened such as by Velcro®. The pet protection device 10 thus substantially covers the dog's back and extending around to the sides of the dog. The pet protection device 10 is defined by a perimeter 90 along which is sewn an edging or trim 28, preferably made from a fabric material. As can be seen, the pet protection device 10 has a front surface 12 on which can be applied a logo 95 or other indicia, drawing, text, decoration or the like. As can also be seen, a collar or neck piece 24 is attached to the pet protection device 10 to provide comfort near the back of the dog's neck.

FIG. 2 illustrates a front view of the pet protection device 10, comprising a front surface 12, back surface 14 (not shown, see FIG. 3), top side or edge 16, bottom side or edge 18, left side or edge 20, right side or edge 22, top strap 30 comprising first strap portion 32 and second strap portion 34 having strap fastener 36 and complimentary strap fastener 38 (on back of strap portion 34, as best seen in FIG. 3) respectively, midsection strap 40 comprising first strap portion 42 and second strap portion 44 having strap fastener 46 and complimentary strap fastener 48 (on back of strap portion 44, as best seen in FIG. 3) respectively.

As can be seen, the strap portions 42 and 44 extend out substantially perpendicular to the longitudinal axis of the pet protection device 10. The longitudinal axis is defined as an imaginary line running from the top edge 16 or bottom edge 18 to the other of the top edge 16 or bottom edge 18 and bisecting the pet protection device 10. Strap portions 32 and 34 extend out substantially at approximately a forty-five degree angle from the longitudinal axis. Such a configuration of straps allows for quick and easy attachment around a dog in a comfortable manner.

Pet protection device 10 further comprises a collar or neck portion 24 suitably attached to the pet detection device 10, for example by way of being stitched to an attachment strip 25 (on back surface 14, as best seen in FIG. 3). Neck portion 24 can be any suitable material, but is preferably leather. Also attached to the pet protection device 10 is a metal ring 26 secured to the pet protection device 10 by a loop 27 of material, for example leather, attached to the pet protection device 10 in any suitable manner, such as by stitching. An extension piece 50 can also be seen attached at the bottom side 18, as best seen and will be described in more detail with reference in particular to FIGS. 3 and 8. Extension piece 50 is preferably attached to a suitable complimentary extension fastener 72 (on back surface 14), such as a patch of Velrco®, allowing selective positioning and adjustability of the extension piece 50.

The pet protection device has a perimeter 90 along which is attached an edging or trim 28 of any suitable material such as fabric. Perimeter 90 is defined by a plurality of transition points A-J, defining perimeter sections or edges 90a-90j. Thus, as can be seen, perimeter section 90a extends between transition points A and B, and defines a slightly curved horizontal line as shown. Perimeter section 90b extends between transition points B and C, and defines a substantially straight, relatively short line at an angle as shown. Perimeter section 90c extends between transition points C and D, and defines a generally curved vertical line as shown. Perimeter section 90d extends between transition points D and E, and defines a substantially straight, relatively short vertical line as shown. Perimeter section 90e extends between transition points E and F, and defines a slightly S-shaped line at an angle as shown. Perimeter section 90f extends between transition points F and G, and defines a slightly curved horizontal line as shown. Perimeter section 90g extends between transition points G and H, and defines a slightly S-shaped line at an angle as shown. Perimeter section 90h extends between transition points H and I, and defines a substantially straight, relatively short vertical line as shown. Perimeter section 90i extends between transition points I and J, and defines a generally curved vertical line as shown. Perimeter section 90j extends between transition points J and A, and defines a substantially straight, relatively short line at an angle as shown.

FIG. 3 illustrates a back view of the pet protection device, comprising a front surface 12 (not shown, see FIG. 2), back surface 14, top side or edge 16, bottom side or edge 18, left side or edge 20 (relative to FIG. 2), right side or edge 22 (relative to FIG. 2), top strap 30 comprising first strap portion 32 and second strap portion 34 having strap fastener 36 (on front of strap portion 32, as best seen in FIG. 2) and complimentary strap fastener 38 respectively, midsection strap 40 comprising first strap portion 42 and second strap portion 44 having strap fastener 46 (on front of strap portion 42, as best seen in FIG. 2) and complimentary strap fastener 48 respectively. Pet protection device 10 further comprises a collar or neck portion 24 suitably attached to the pet detection device 10, for example by way of being stitched to an attachment strip 25.

Pet protection device 10 further comprises at least one spacer 80 suitably attached to the back surface 14 of the pet detection device 10, for example by way of an adhesive. Spacer 80 is shown as a first spacer 82 and a second spacer 84, each comprising a strip of any suitable material, preferably a foam-like or sponge-like material. It should be understood that spacer 80 could take any suitable shape other than as illustrated.

Figure 8:
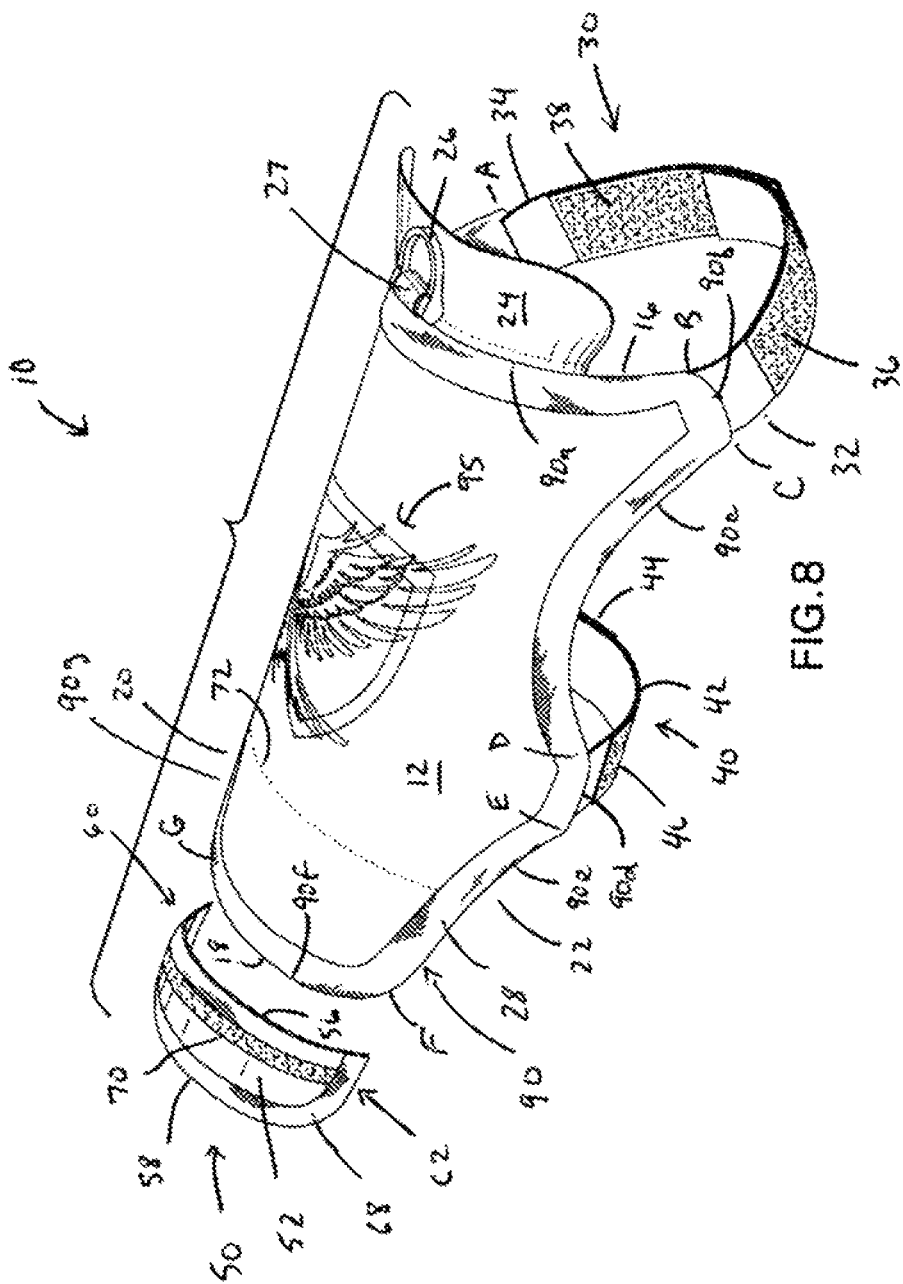
FIG. 8 is an exploded perspective view of the pet protection device of FIG. 1.

An extension piece 50 can also be seen in FIG. 3 attached at the bottom side 18 of pet protection device 10. The extension piece 50 comprises a single layer of semi-rigid, twenty gauge polycarbonate. Further, the extension piece 50 preferably comprises front surface 52 (not shown, see FIG. 8), back surface 54, top side or edge 56, bottom side or edge 58, left side or edge 60 (relative to FIG. 2), right side or edge 62 (relative to FIG. 2), and a suitable extension fastener 70 (on front surface 52, as best seen in FIG. 8). The extension piece 50 is generally D-shaped, as shown, and preferably has edging or trim 68 of suitable material, such as fabric, around its perimeter.

The pet protection device has a perimeter 90 along which is attached an edging or trim 28 of any suitable material such as fabric. Perimeter 90 is defined by a plurality of transition points A-J, defining perimeter sections or edges 90a-90j. Thus, as can be seen, perimeter section 90a extends between transition points A and B, and defines a slightly curved horizontal line as shown. Perimeter section 90b (hidden behind strap portion 32) extends between transition points B and C, and defines a substantially straight, relatively short line at an angle as shown. Perimeter section 90c extends between transition points C and D, and defines a generally curved vertical line as shown. Perimeter section 90d (hidden behind strap portion 42) extends between transition points D and E, and defines a substantially straight, relatively short vertical line as shown. Perimeter section 90e extends between transition points E and F, and defines a slightly S-shaped line at an angle as shown. Perimeter section 90f (hidden behind extension piece 50) extends between transition points F and G, and defines a slightly curved horizontal line as shown. Perimeter section 90g extends between transition points G and H, and defines a slightly S-shaped line at an angle as shown. Perimeter section 90h (hidden behind strap portion 44) extends between transition points H and I, and defines a substantially straight, relatively short vertical line as shown. Perimeter section 90i extends between transition points I and J, and defines a generally curved vertical line as shown. Perimeter section 90j (hidden behind strap portion 34) extends between transition points J and A, and defines a substantially straight, relatively short line at an angle as shown.

Figure 4:
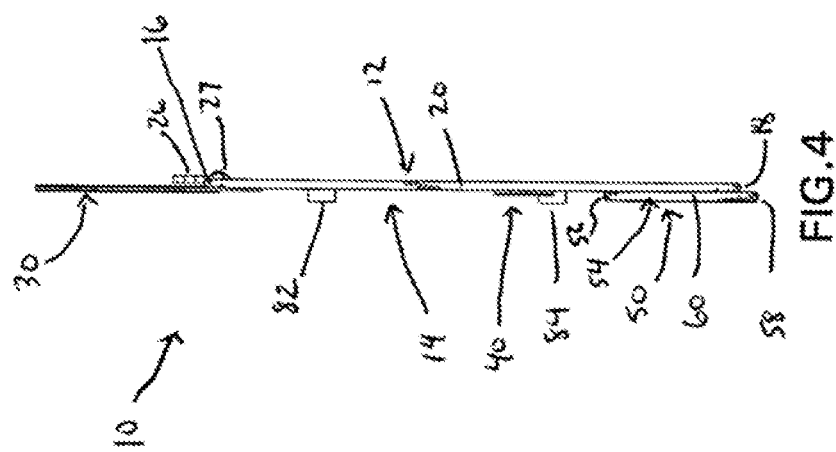
FIG. 4 is a left side view of the pet protection device, as seen from the left side of FIG. 2.

FIG. 4 illustrates a left side view of the pet protection device 10, as seen from the left side of FIG. 2. As can be seen, pet protection device 10 comprises a front surface 12, back surface 14, top side or edge 16, bottom side or edge 18, left side or edge 20, right side or edge 22 (not shown), top strap 30, and midsection strap 40. Pet protection device 10 further comprises a metal ring 26, secured to the pet protection device 10 by a loop 27 of material, as well as first spacer 82 and second spacer 84. An extension piece 50 can also be seen in FIG. 4 attached proximate the bottom side 18 of pet protection device 10. The extension piece 50 comprises front surface 52 (not shown), back surface 54, top side or edge 56, bottom side or edge 58, left side or edge 60 (relative to FIG. 2), and right side or edge 62 (not shown) (relative to FIG. 2).

Figure 5:
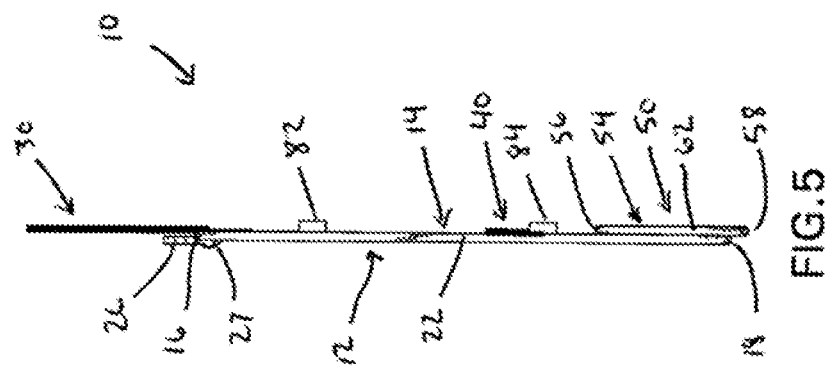
FIG. 5 is a right side view of the pet protection device, as seen from the right side of FIG. 2.

FIG. 5 illustrates a right side view of the pet protection device 10, as seen from the right side of FIG. 2. As can be seen, pet protection device 10 comprises a front surface 12, back surface 14, top side or edge 16, bottom side or edge 18, left side or edge 20 (not shown), right side or edge 22, top strap 30, and midsection strap 40. Pet protection device 10 further comprises a metal ring 26, secured to the pet protection device 10 by a loop 27 of material, as well as first spacer 82 and second spacer 84. An extension piece 50 can also be seen in FIG. 5 attached proximate the bottom side 18 of pet protection device 10. The extension piece 50 comprises front surface 52 (not shown), back surface 54, top side or edge 56, bottom side or edge 58, left side or edge 60 (not shown) (relative to FIG. 2), and right side or edge 62 (relative to FIG. 2).

FIG. 6 illustrates a top view of the pet protection device, as seen from the top of FIG. 2. As can be seen, pet protection device 10 comprises a front surface 12, back surface 14, top side or edge 16, bottom side or edge 18 (not shown), left side or edge 20, right side or edge 22, top strap 30 comprising first strap portion 32 and second strap portion 34 having strap fastener 36 and complimentary strap fastener 38 respectively, and midsection strap 40 (not shown). Pet protection device 10 further comprises a metal ring 26, secured to the pet protection device 10 by a loop 27 of material, as well as first spacer 82 and second spacer 84 (not shown).

FIG. 7 illustrates a bottom view of the pet protection device, as seen from the bottom of FIG. 2. As can be seen, pet protection device 10 comprises a front surface 12, back surface 14, top side or edge 16 (not shown), bottom side or edge 18, left side or edge 20, right side or edge 22, top strap 30 (not shown), and midsection strap 40 comprising first strap portion 42 and second strap portion 44 having strap fastener 46 and complimentary strap fastener 48 respectively. Pet protection device 10 further comprises a metal ring 26, secured to the pet protection device 10 by a loop 27 of material, as well as first spacer 82 (not shown) and second spacer 84. An extension piece 50 can also be seen in FIG. 7 attached proximate the bottom side 18 of pet protection device 10. The extension piece 50 comprises front surface 52 (not shown), back surface 54 (not shown), top side or edge 56 (not shown), bottom side or edge 58, left side or edge 60 (relative to FIG. 2), and right side or edge 62 (relative to FIG. 2).

FIG. 8 illustrates an exploded perspective view of the pet protection device of FIG. 1 with the straps 30 and 40 fastened. As discussed above, pet protection device 10 comprises a front surface 12, back surface 14 (not shown), top side or edge 16, bottom side or edge 18, left side or edge 20, right side or edge 22, top strap 30 comprising first strap portion 32 and second strap portion 34 having strap fastener 36 and complimentary strap fastener 38 respectively, midsection strap 40 comprising first strap portion 42 and second strap portion 44 having strap fastener 46 and complimentary strap fastener 48 (not shown) respectively. Pet protection device 10 further comprises a collar or neck portion 24, a metal ring 26 secured to the pet protection device 10 by a loop 27 of material, and edging or trim 28 of suitable material, such as fabric, around its perimeter.

An extension piece 50 can also be seen in FIG. 8 for adjustable attachment proximate the bottom side 18 of pet protection device 10. The extension piece 50 comprises front surface 52, back surface 54 (not shown), top side or edge 56, bottom side or edge 58, left side or edge 60 (relative to FIG. 2), right side or edge 62 (relative to FIG. 2), and a suitable extension fastener 70, preferably in the form of a strip of Velcro®. Extension piece 50 is preferably attached to a suitable complimentary extension fastener 72 (on back surface 14), such as a patch of Velrco®, allowing selective positioning and adjustability of the extension piece 50. The patch of Velcro® 72 preferably extends from the edge or stitch line of 72 seen in FIG. 8 to the bottom edge 18 such that the strip of Velcro® 70 can be positioned such that extension piece 50 extends at various desired lengths out from bottom edge 18. Extension piece 50 also has edging or trim 68 of suitable material, such as fabric, around its perimeter.

The pet protection device 10 has a perimeter 90 defined by a plurality of transition points A-J (H-J not shown), defining perimeter sections or edges 90a-90j (90h-90j not shown). Thus, as can be seen, perimeter section 90a extends between transition points A and B, perimeter section 90b extends between transition points B and C, perimeter section 90c extends between transition points C and D, perimeter section 90d extends between transition points D and E, perimeter section 90e extends between transition points E and F, perimeter section 90f extends between transition points F and G, and perimeter section 90g extends between transition points G and H (not shown).

Figure 9:
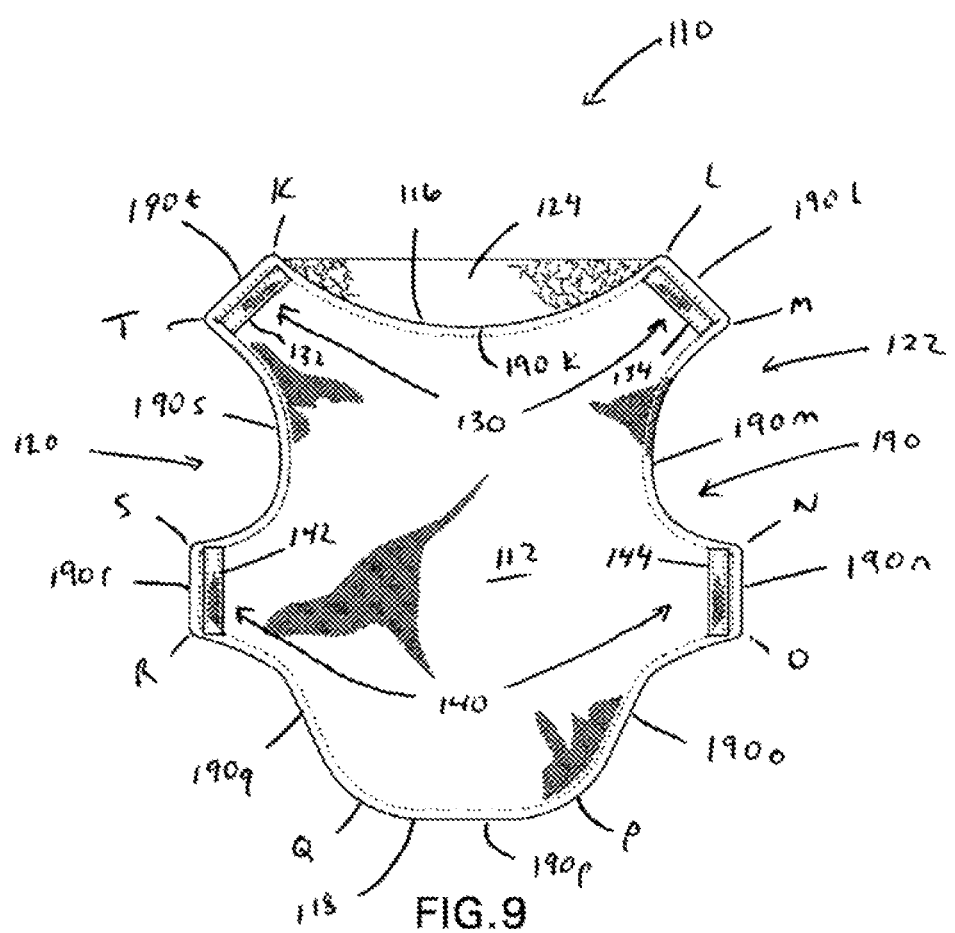
FIG. 9 is a front view of the liner of the pet protection device.

FIG. 9 illustrates a front view of the liner 110 used in conjunction with the pet protection device 10. Liner 110 comprises a front surface 112, back surface 114 (not shown, see FIG. 10), top side or edge 116, bottom side or edge 118, left side or edge 120, right side or edge 122, top belt loops 130 comprising first belt loop 132 and second belt loop 134, midsection belt loops 140 comprising first belt loop 142 and second belt loop 144. Front surface 112 is preferably made from a waterproof fabric, while back surface 114 is preferably made from a fleece material. A layer of insulation, such as Thinsulate®, is preferably sewn between front surface 112 and back surface 114. Liner 110 further comprises a collar or neck portion 124 which is preferably an extension of the fleece material of back surface 114, but could be a separate piece of material sewn to the liner.

The liner 110 has a perimeter 190 defined by a plurality of transition points K-T, defining perimeter sections or edges 190k-190t. Thus, as can be seen, perimeter section 190k extends between transition points K and L, and defines a curved horizontal line as shown. Perimeter section 190l extends between transition points L and M, and defines a substantially straight, relatively short line at an angle as shown. Perimeter section 190M extends between transition points M and N, and defines a generally curved vertical line as shown. Perimeter section 190n extends between transition points N and O, and defines a substantially straight, relatively short vertical line as shown. Perimeter section 190o extends between transition points O and P, and defines a slightly S-shaped line at an angle as shown. Perimeter section 190p extends between transition points P and Q, and defines a slightly curved horizontal line as shown. Perimeter section 190q extends between transition points Q and R, and defines a slightly S-shaped line at an angle as shown. Perimeter section 190r extends between transition points R and S, and defines a substantially straight, relatively short vertical line as shown. Perimeter section 190s extends between transition points S and T, and defines a generally curved vertical line as shown. Perimeter section 190t extends between transition points T and K, and defines a substantially straight, relatively short line at an angle as shown.

Figure 10:
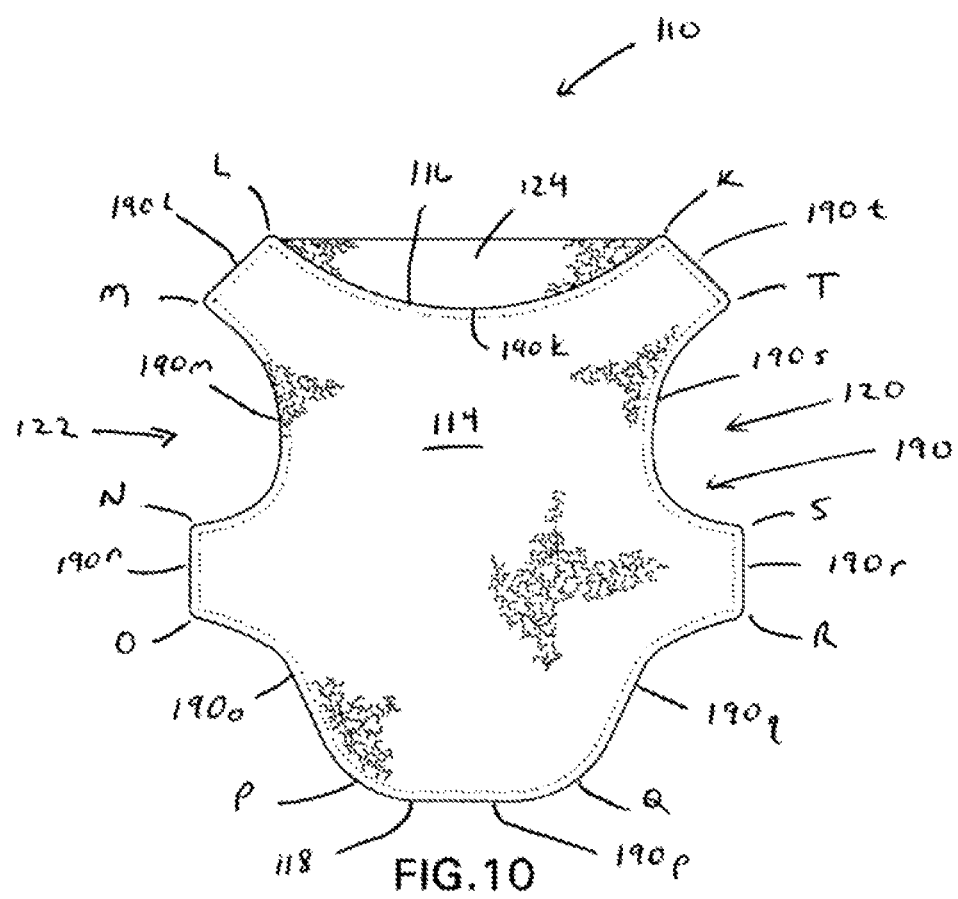
FIG. 10 is a back view of the liner of the pet protection device.

FIG. 10 illustrates a back view of the liner 110 used in conjunction with the pet protection device 10. Liner 110 comprises a front surface 112 (not shown, see FIG. 9), back surface 114 top side or edge 116, bottom side or edge 118, left side or edge 120 (relative to FIG. 9), right side or edge 122 (relative to FIG. 9). Liner 110 further comprises a collar or neck portion 124 which is preferably an extension of the fleece material of back surface 114, but could be a separate piece of material sewn to the liner.

The liner 110 has a perimeter 190 defined by a plurality of transition points K-T, defining perimeter sections or edges 190k-190t. Thus, as can be seen, perimeter section 190k extends between transition points K and L, and defines a curved horizontal line as shown. Perimeter section 190l extends between transition points L and M, and defines a substantially straight, relatively short line at an angle as shown. Perimeter section 190M extends between transition points M and N, and defines a generally curved vertical line as shown. Perimeter section 190n extends between transition points N and O, and defines a substantially straight, relatively short vertical line as shown. Perimeter section 190o extends between transition points O and P, and defines a slightly S-shaped line at an angle as shown. Perimeter section 190p extends between transition points P and Q, and defines a slightly curved horizontal line as shown. Perimeter section 190q extends between transition points Q and R, and defines a slightly S-shaped line at an angle as shown. Perimeter section 190r extends between transition points R and S, and defines a substantially straight, relatively short vertical line as shown. Perimeter section 190s extends between transition points S and T, and defines a generally curved vertical line as shown. Perimeter section 190t extends between transition points T and K, and defines a substantially straight, relatively short line at an angle as shown.

Figure 11:
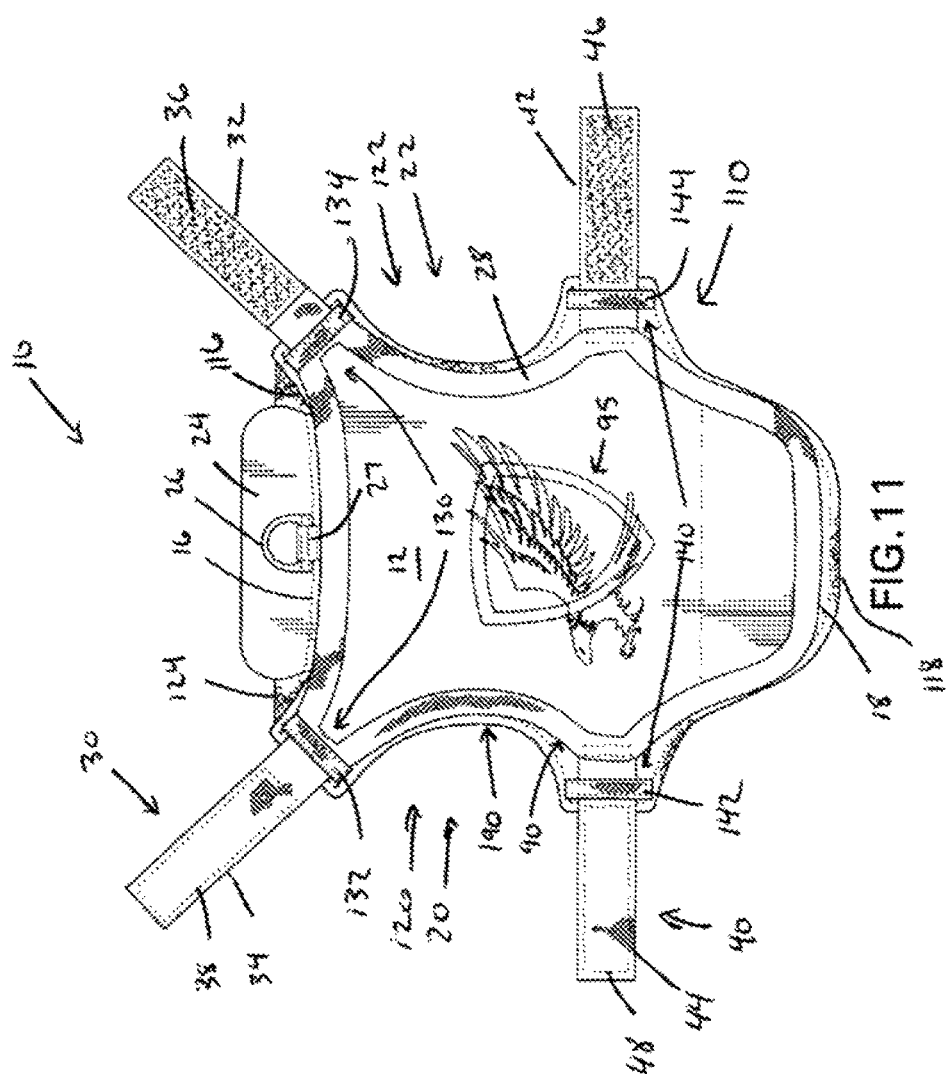
FIG. 11 is a front view of the pet protection device with liner attached thereto.

FIG. 11 illustrates a front view of the pet protection device 10 with liner 110 attached thereto. The pet protection device 10, comprising a front surface 12, back surface 14 (not shown), top side or edge 16, bottom side or edge 18, left side or edge 20, right side or edge 22, top strap 30 comprising first strap portion 32 and second strap portion 34 having strap fastener 36 and complimentary strap fastener 38 (on back of strap portion 34) respectively, midsection strap 40 comprising first strap portion 42 and second strap portion 44 having strap fastener 46 and complimentary strap fastener 48 (on back of strap portion 44) respectively. Pet protection device 10 further comprises a collar or neck portion 24, a metal ring 26 secured to the pet protection device 10 by a loop 27 of material, and edging or trim 28 around a perimeter 90 of the pet protection device. Also, logo 95 is illustrated on top surface 12.

Liner 110 comprises a front surface 112 (under pet protection device 10), back surface 114 (not shown), top side or edge 116, bottom side or edge 118, left side or edge 120, right side or edge 122, top belt loops 130 comprising first belt loop 132 and second belt loop 134, midsection belt loops 140 comprising first belt loop 142 and second belt loop 144. Liner 110 further comprises a collar or neck portion 124. Further, liner 110 is defined by a perimeter 190. As can be seen by a comparison of the perimeter 90 of the pet protection device 10 and the perimeter 190 of the liner 110, the liner 110 is preferably slightly bigger in overall size/shape than the pet protection device 10.

As can be seen in FIG. 11, to attach the liner 110 to the pet protection device 10, with both front surface 12 and front surface 112 facing up, the strap portion 32 is placed through belt loop 134, strap portion 34 is placed through belt loop 132, strap portion 44 is place through belt loop 142 and strap portion 42 is place through belt look 144. No further attachment or securing is required. Once placed through the belt loops, and the straps 30 and 40 are secured around a dog, there will be minimal movement between pet protection device 10 and liner 110, and they will essentially function as if they were integral with each other.

The device can be made in different sizes for different sized pets. For example, the device can be made in three sizes, double extra small (XXS) for pets approximately 2-4 lbs., extra small (XS) for pets approximately 4-6 lbs. and small (S) for pets approximately 6-12 lbs.

While the foregoing discussion presents the teachings in an exemplary fashion with respect to the disclosed method and device for protecting a pet from an attack by a bird of prey, it will be apparent to those skilled in the art that the teachings may apply to any type of animal protection device. Further, while the foregoing has described what are considered to be the best mode and/or other examples, it is understood that various modifications may be made therein and that the subject matter disclosed herein may be implemented in various forms, examples and sizes, and that the teachings may be applied in numerous applications, only some of which have been described herein.

What is claimed is:

1. A pet protection device for shielding a pet having front legs, back legs, a neck, a tail, a torso and a back, from a predatory animal, comprising:
   a semi-rigid sheet of plastic material defining a seamless surface area and adapted to be worn by a pet over the back of the pet and adapted to extend substantially from the neck of the pet to the tail of the pet, and being sufficient to prevent penetration by a talon of the predatory animal through the sheet of plastic to the back of the pet; and
   at least one fastener attached to the sheet of plastic material for securing the sheet of plastic material to the back of the pet, wherein the at least one fastener comprises a first strap and a second strap;
   wherein the sheet of plastic material has a longitudinal axis, and wherein the first strap comprises a first strap portion and a second strap portion extending at angle to the longitudinal axis, and wherein the first strap is adapted to fasten around the torso of the net proximate the front legs of the pet;
   wherein second strap comprises a first strap portion and a second strap portion extending substantially perpendicular to the longitudinal axis, and wherein the second strap is adapted to fasten around the torso of the net proximate the back legs of the pet;
   wherein the sheet of plastic material forms a shield about its surface area to protect the back of the pet from the talons of the predatory animal; wherein the sheet of plastic material has a longitudinal axis, and wherein the surface area is defined by a perimeter, and wherein the perimeter is defined by a plurality of transition points A. B. C. D. E. F. G. H. I and J, and a plurality of edges extending between each adjacent transition points;
   wherein transition point A is located at a point where an inside edge of the second strap portion of the first strap meets the semi-rigid sheet of plastic material:
   wherein transition point B is located at a point where an inside edge of the first strap portion of the first strap meets the semi-rigid sheet of plastic material:
   wherein transition point C is located at a point where an outside edge of the first strap portion of the first strap meets the semi-rigid sheet of plastic material;
   wherein transition point D is located at a point where a topside edge of the first strap portion of the second strap meets the semi-rigid sheet of plastic material:
   wherein transition point E is located at a point where a bottomside edge of the first strap portion of the second strati meets the semi-rigid sheet of plastic material:
   wherein transition point F is located at a first bottom corner of the semi-rigid sheet of plastic material, proximate transition point E:
   wherein transition point G is located at a second bottom corner of the semi-rigid sheet of plastic material, proximate transition point H:
   wherein transition point H is located at a point where a bottomside edge of the second strap portion of the second strap meets the semi-rigid sheet of plastic material:
   wherein transition point I is located at a point where a topside edge of the second strap portion of the second strap meets the semi-rigid sheet of plastic material:
   wherein transition point J is located at a point where an outside edge of the second strap portion of the first strap meets the semi-rigid sheet of plastic material:
   wherein a first edge extends between transition points A and B, and defines a slightly curved neck line in a direction generally transverse to the longitudinal axis, wherein the entire first edge is located above a reference line defined from transition point J to transition point C:
   wherein a second edge extends between transition points B and C, and defines a substantially straight, relatively short first connection line at an angle to the longitudinal axis;
   wherein a third edge extends between transition points C and D, and defines a generally curved first torso line in a direction generally parallel to the longitudinal axis, wherein the entire third edge is located to an inside of a reference line defined from transition point C to transition point S;
   wherein a fourth edge extends between transition points D and E, and
   defines a substantially straight, relatively-short second connection line in a direction generally parallel to the longitudinal axis;
   wherein a fifth edge extends between transition points E and F, and defines a slightly S abased first back leg line at an angle to the longitudinal axis,
   wherein the entire fifth edge is located to an inside of a reference line extending through transition points P and E:
   wherein a sixth edge extends between transition points F and G, and defines a slightly-curved tail line in a direction generally transverse to the longitudinal axis;
   wherein a seventh edge extends between transition points G and H, and defines a slightly S shaped second back leg line at an angle to the longitudinal axis, wherein the entire seventh edge is located to an inside of a reference line extending through transition points I and H:
   wherein an eighth edge extends between transition points H and I, and defines a substantially straight; relatively short third connection line in a direction generally parallel to the longitudinal axis;
   wherein a ninth edge extends between transition points I and J, and defines a generally curved second torso line in a direction generally parallel to the longitudinal axis, wherein the entire ninth edge is located to an inside of a reference line defined from transition point J to transition point I: and
   wherein a tenth edge extends between transition points J and A, and defines a substantially straight, relatively short fourth connection line at an angle to the longitudinal axis.

2. The device of claim 1, wherein the sheet of plastic material is polycarbonate.

3. The device of claim 1, wherein the sheet of plastic material is twenty gauge polycarbonate.

4. The device of claim 1, further comprising an extension piece of plastic material selectively attached to the sheet of plastic material at a tail end to selectively increase the surface area.

5. The device of claim 1, further comprising a liner removably attached to the sheet of plastic material.

6. A method for protecting a pet having front legs, back legs, a neck, a tail, a torso and a back, by shielding the pet from a predatory animal, comprising the steps of:
providing a semi-rigid sheet of plastic material defining a seamless surface area and adapted to be worn by a pet over the back of the pet and adapted to extend substantially from the neck of the pet to the tail of the pet, and being sufficient to prevent penetration by a talon of the predatory animal through the sheet of plastic to the back of the pet;
providing at least one fastener attached to the sheet of plastic material for securing the sheet of plastic material to the back of the pet, wherein the step of providing at least one fastener includes providing a first strap and a second strap;
wherein the step of providing a first strap includes providing a first strap portion and a second strap portion extending at an angle to a longitudinal axis of the sheet of plastic material, and wherein the first straw is adapted to fasten around the torso of the net proximate the front legs of the pet;
wherein the step of providing a second strap includes providing a first strap portion and a second strap portion extending substantially perpendicular to a longitudinal axis of the sheet of plastic material and wherein the second strap is adapted to fasten around the torso of the pet proximate the back legs of the pet; and
securing the sheet of plastic material to the back of the pet to form a shield about its surface area to protect the back of the pet from the talons of the predatory animal;
wherein the sheet of plastic material has a longitudinal axis, and wherein the surface area is defined by a perimeter, and further comprising the steps of:
defining the perimeter by a plurality of transition points A, B, C, D, E, F, G, H, I and J, and a plurality of edges extending between each adjacent transition points;
wherein transition point A is located at a point where an inside edge of the second strap portion of the first strap meets the semi-rigid sheet of plastic material;
wherein transition point B is located at a point where an inside edge of the first strap portion of the first strap meets the semi-rigid sheet of plastic material;
wherein transition point C is located at a point where an outside edge of the first strap portion of the first strap meets the semi-rigid sheet of plastic material;
wherein transition point D is located at a point where a topside edge of the first strap portion of the second strap meets the semi-rigid sheet of plastic material;
wherein transition point E is located at a point where a bottomside edge of the first strap portion of the second strap meets the semi-rigid sheet of plastic material;
wherein transition point F is located at a first bottom corner of the semi-rigid sheet of plastic material, proximate transition point E;
wherein transition point G is located at a second bottom corner of the semi-rigid sheet of plastic material, proximate transition point H;
wherein transition point H is located at a point where a bottomside edge of the second strap portion of the second strap meets the semi-rigid sheet of plastic material;
wherein transition point I is located at a point where a topside edge of the second strap portion of the second strap meets the semi-rigid sheet of plastic material;
wherein transition point J is located at a point where an outside edge of the second strap portion of the first strap meets the semi-rigid sheet of plastic material;
wherein a first edge extends between transition points A and B, and defines a neck line in a direction generally transverse to the longitudinal axis, wherein the entire first edge is located above a reference line defined from transition point J to transition point C;
wherein a second edge extends between transition points B and C, and defines a first connection line at an angle to the longitudinal axis;
wherein a third edge extends between transition points C and D, and defines a first torso line in a direction generally parallel to the longitudinal axis, wherein the entire third edge is located to an inside of a reference line defined from transition point C to transition point D;
wherein a fourth edge extends between transition points D and E, and defines a second connection line in a direction generally parallel to the longitudinal axis;
wherein a fifth edge extends between transition points E and F, and defines a first back leg line at an angle to the longitudinal axis, wherein the entire fifth edge is located to an inside of a reference line extending through transition points D and E;
wherein a sixth edge extends between transition points F and G, and defines a tail line in a direction generally transverse to the longitudinal axis;
wherein a seventh edge extends between transition points G and H, and defines a second back leg line at an angle to the longitudinal axis, wherein the entire seventh edge is located to an inside of a reference line extending through transition points I and H;
wherein an eighth edge extends between transition points H and I, and defines a third connection line in a direction generally parallel to the longitudinal axis;
wherein a ninth edge extends between transition points I and J, and defines a second torso line in a direction generally parallel to the longitudinal axis, wherein the entire ninth edge is located to an inside of a reference line defined from transition point J to transition point I; and
wherein a tenth edge extends between transition points J and A, and defines a fourth connection fine at an angle to the longitudinal axis.

7. The method of claim 6, wherein the sheet of plastic material is polycarbonate.

8. The method of claim 7, wherein the sheet of plastic material is twenty gauge polycarbonate.

9. The method of claim 6, further comprising the steps of providing an extension piece of plastic material, and selectively attaching the extension piece of plastic material to the sheet of plastic material at a tail end to selectively increase the surface area.

10. The method of claim 6, further comprising the steps of providing a liner, and removably attaching the liner to the sheet of plastic material.

11. The device of claim 1, wherein the sheet of plastic material has brightly colored edging about its perimeter.

12. The device of claim 1, further comprising a piece of leather attached at the top end of the sheet of plastic material adapted to provide for comfort near a back portion of the neck of the pet.

13. The device of claim 12, further comprising a metal ring affixed to the sheet of plastic material near the piece of leather adapted to provide for attachment of a leash.

14. The method of claim 6, further comprising the step of providing a brightly colored edging about a perimeter of the sheet of plastic material.

15. The method of claim 6, further comprising the step of providing a piece of leather attached at the top end of the sheet of plastic material for providing comfort near a back portion of the neck of the pet.

16. The method of claim 6, further comprising the step of affixing a metal ring to the sheet of plastic material near the piece of leather to provide for attachment of a leash.

* * * * *